(12) United States Patent
Vargo et al.

(10) Patent No.: US 6,544,935 B1
(45) Date of Patent: Apr. 8, 2003

(54) NITROGEN-CONTAINING ESTERIFIED CARBOXY-CONTAINING INTERPOLYMERS HAVING ENHANCED OXIDATIVE STABILITY AND LUBRICANTS CONTAINING THEM

(75) Inventors: Daniel M. Vargo, Concord, OH (US); Craig D. Tipton, Perry, OH (US); Richard M. Lange, Euclid, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/030,606

(22) PCT Filed: Jul. 6, 2000

(86) PCT No.: PCT/US00/18503

§ 371 (c)(1),
(2), (4) Date: Jan. 9, 2002

(87) PCT Pub. No.: WO01/04242

PCT Pub. Date: Jan. 18, 2001

Related U.S. Application Data

(60) Provisional application No. 60/143,027, filed on Jul. 9, 1999.

(51) Int. Cl.[7] ............... C10M 149/06; C10M 149/14; C08F 8/32
(52) U.S. Cl. .............. 508/232; 508/235; 508/471; 525/327.6; 525/327.7
(58) Field of Search ................... 508/232, 235

(56) References Cited

U.S. PATENT DOCUMENTS

| | | | |
|---|---|---|---|
| 2,977,334 A | 3/1961 | Zopf, Jr. ............ 252/51.5 |
| 2,992,987 A | 7/1961 | Fields ............... 151/56 |
| 3,085,994 A | 4/1963 | Muskat .............. 260/78.5 |
| 3,329,658 A | 7/1967 | Fields ............... 260/78.5 |
| 3,388,106 A | 6/1968 | Muskat .............. 260/78.5 |
| 3,392,155 A | 7/1968 | Muskat .............. 260/78.5 |
| 3,449,250 A | 6/1969 | Fields ............... 252/51.5 |
| 3,702,300 A | 11/1972 | Coleman ............. 252/51.5 A |
| 3,933,761 A | 1/1976 | Coleman ............. 260/78.5 |
| 3,956,149 A | 5/1976 | Coleman ............. 252/51.5 A |
| 3,959,159 A | 5/1976 | Coleman ............. 252/51.5 A |
| 4,180,637 A | 12/1979 | Evani et al. ......... 526/204 |
| 4,200,720 A | 4/1980 | Evani et al. ......... 526/233 |
| 4,284,414 A | 8/1981 | Bryant ............... 44/62 |
| 4,594,378 A | 6/1986 | Tipton et al. ........ 524/106 |
| 4,604,221 A | 8/1986 | Bryant et al. ........ 252/51.5 A |
| 4,654,050 A | 3/1987 | Koch et al. .......... 44/62 |
| 4,654,403 A | 3/1987 | Tipton ............... 525/194 |
| 4,734,446 A | 3/1988 | Tipton ............... 524/106 |
| 5,124,059 A | 6/1992 | Koch et al. .......... 252/56 R |
| 5,157,088 A | 10/1992 | Dishong et al. ....... 525/327.6 |
| 5,256,752 A | 10/1993 | Dishong et al. ....... 526/329.5 |
| 5,283,235 A | 2/1994 | Bush et al. .......... 507/118 |
| 5,707,943 A * | 1/1998 | Covitch .............. 508/466 |
| 6,071,862 A * | 6/2000 | Shanklin, Jr. et al. . 508/452 |
| 6,133,210 A * | 10/2000 | Tipton ............... 508/469 |
| 6,258,761 B1 * | 7/2001 | Lange et al. ......... 508/452 |

FOREIGN PATENT DOCUMENTS

EP 0848053 6/1998

* cited by examiner

*Primary Examiner*—Ellen M. McAvoy
(74) *Attorney, Agent, or Firm*—David M. Shold; Michael F. Esposito

(57) ABSTRACT

A nitrogen-containing ester derived from a carboxy-containing interpolymer having a reduced specific viscosity (RSV) of from about 0.05 to about 2, said interpolymer being derived from at least two monomers, (i) one of said monomers being at least one of an aliphatic olefin containing from 2 to about 30 carbon atoms and a vinyl aromatic monomer and (ii) the other of said monomers being at least one alpha, beta-unsaturated acylating agent, said ester being characterized by the presence within its polymeric structure of each of the following groups which are derived from the carboxy groups of said interpolymer: (A) from about 20 to about 70 mole % based on moles of carboxyl groups in said interpolymer, of ester groups containing from about 13 to about 19 carbon atoms; (B) from about 80 to about 30 mole %, based on moles of carboxyl groups in said interpolymer, of ester groups containing from about 8 to about 12 carbon atoms, optionally; (C) up to about 20 mole %, based on moles of carboxyl groups in said interpolymer, of ester groups containing from 2 to 7 carbon atoms; wherein from about 93 to about 97% of the carboxy groups derived from the carboxy-containing interpolymer are ester groups, the balance of the carboxy groups comprising residual carboxylic acid or anhydride groups which are then (D) reacted with at least one amino compound having an average of from 1 to about 1.1 primary or secondary amino groups, to convert from about 5 up to less than 50% of the carboxylic acid or anhydride groups to carbonyl-amino groups, with the unreacted carboxylic acid or anhydride groups remaining as (E) residual carboxylic acid or anhydride groups. Additive concentrates and lubricating oil compositions are also disclosed.

29 Claims, No Drawings

NITROGEN-CONTAINING ESTERIFIED CARBOXY-CONTAINING INTERPOLYMERS HAVING ENHANCED OXIDATIVE STABILITY AND LUBRICANTS CONTAINING THEM

This application claims the benefit of Provisional Application No. 60/143,027, filed Jul. 9,1999.

FIELD OF THE INVENTION

This invention relates to nitrogen-containing esterified carboxy-containing interpolymers and to lubricating compositions containing them. More particularly, this invention relates to nitrogen-containing esterified interpolymers derived from low molecular weight olefin or vinyl aromatic compounds and alpha, beta-unsaturated acylating agent, such interpolymers being esterified with aliphatic alcohols and partially neutralized with amino compounds having an average of from about 1 to about 1.1 primary or secondary amino groups. The resulting compositions are particularly useful as viscosity improvers having improved oxidative stability.

BACKGROUND OF THE INVENTION

The viscosity of oils of lubricating viscosity is generally dependent upon temperature. As the temperature of the oil is increased, the viscosity usually decreases, and as the temperature is reduced, the viscosity usually increases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved since the oil maintains a more consistent viscosity over a wider range of temperatures.

Viscosity improvers are usually polymeric materials and are often referred to as viscosity index improvers and sometimes as viscosity modifiers.

Ester group containing polymers are well-known additives for improving the fluidity characteristic of lubricating oils. Polyacrylate, particularly polymethacrylate ester polymers, and esterified carboxy-containing interpolymers are well-known and are widely used for this purpose.

Dispersants are also well-known in the lubricating art. Dispersants are employed in lubricants to keep impurities, particularly those formed during operation of machinery, in suspension rather than allowing them to deposit on the surfaces of parts contacted by the lubricant.

Multifunctional additives that provide both viscosity improving properties and dispersant properties are likewise known in the art. Such products are described in numerous publications including Dieter Klamann, "Lubricants and Related Products", Verlag Chemie Gmbh (1984), pp 185–193; C. V. Smalheer and R. K. Smith "Lubricant Additives", Lezius-Hiles Co. (1967); M. W. Ranney, "Lubricant Additives", Noyes Data Corp. (1973), pp 92–145, M. W. Ranney, "Lubricant Additives, Recent Developments", Noyes Data Corp. (1978), pp 139–164; and M. W. Ranney, "Synthetic Oils and Additives for Lubricants", Noyes Data Corp. (1980), pp 96–166. Each of these publications is hereby expressly incorporated herein by reference.

It is also known to improve antioxidant properties of organic compositions such as lubricants and fuel by adding thereto antioxidant compounds such as hindered phenols, sulfur compounds, certain aromatic amines and the like.

It is desirable that the viscosity improver or dispersant viscosity improver not adversely affect the low-temperature viscosity of the lubricant containing same. Frequently, while many viscosity improvers or dispersant viscosity improvers enhance the high temperature viscosity characteristics of lubricating oil, the low temperature properties of the treated lubricant become worse.

Lubricating oils are frequently used in environments that promote oxidation, so it is desirable to manufacture products for use in lubricating oil compositions that do not undergo detrimental degradation under prolonged operating conditions in severe environments.

One of the major requirements for automatic transmission fluids has been improved low temperature performance, the current requirement approximating a maximum Brookfield viscosity of 20,000 centipoise, and more stringent future requirements as low as 10,000 centipoise at −40° C. The viscosity modifier may comprise a significant proportion of the total additive system employed in an automatic transmission fluid and can have a major impact on the low temperature performance. Low temperature performance characteristics are also desirable in other applications such as in gear lubricants. The copolymers of this invention are also useful in many other lubricating oil compositions including, but not limited to engine oils, hydraulic oils, industrial oils, etc.

It is desirable, and a primary object of this invention, to provide compositions that can successfully resist oxidation under use in severe environments.

Another important object is to provide compositions that reduce the extent of loss of viscosity at high temperatures while not adversely increasing the low temperature viscosity of lubricating oil compositions.

Another object is to provide novel additive concentrates containing multi-purpose lubricant additives.

A more specific object is to provide multi-purpose additives directed to improving the viscosity and dispersant properties of a lubricating composition.

Yet another object is to provide lubricants having improved dispersant and viscosity properties.

A further object is to provide lubricants having improved oxidation properties.

Another object is to provide additive concentrates for lubricants, which additive concentrates contain esterified interpolymers that are resistant to shearing.

Other objects will in part be obvious in view of this disclosure and will in part appear hereinafter.

Various pour point depressants, additives which reduce the temperature at which oil will flow freely, have been developed and those to reach the commercial market have primarily been organic polymers, although some monomeric substances such as tetra (long chain alkyl) silicates, phenyl tristearyloxy-silane, and pentaerythritol tetrastearate have been shown to be effective. Presently available commercial pour point depressants are believed to be represented by the following types of polymeric materials: polymethacrylates, for example, copolymers of various chain length alkyl methacrylates (see, for example, U.S. Pat. No. 2,655,479); polyacrylamides (see, for example, U.S. Pat. No. 2,387,501); Friedel-Crafts condensation products of chlorinated paraffin wax with naphthalene (see, for example, U.S. Pat. No. 1,815,022 and 2,015,748); Friedel-Crafts condensation products of chlorinated paraffin wax with phenol (see, for example, U.S. Pat. No. 2,191,498); and vinyl carboxylate, such as dialkyl fumarate copolymers (see, for example, U.S. Pat. Nos. 2,666,746; 2,721,877 and 2,721,878).

Esters of maleic anhydride/alpha-olefin copolymers have been suggested as pour point depressants. For example, U.S. Pat. No. 2,977,334 describes the use of copolymers of maleic anhydride and ethylene which are esterified with low or high molecular weight alcohols and/or amidized with an amine. These resins are described as being useful as pour point modifiers, gelling agents, thickeners, viscosity improvers, etc., for mineral and synthetic oils including functional fluids and lubricating oils. U.S. Pat. No. 2,992,987 describes a class of lubricant additives useful as pour point depressants which are ethylene-maleic anhydride copolymers esterified to 80% or more, preferably 90–100%, with a mixture of straight-chain saturated hydrocarbon alcohols having from 8 to 24 carbon atoms. The unesterified carboxylic groups can be left unreacted or can be reacted with such materials as ethylene or propylene oxide alcohol esters, or lower-dialkylamino-lower-alkylene-amines. U.S. Pat. No. 3,329,658 and 3,449,250 describe copolymers of maleic anhydride and alpha-olefins such as ethylene, propylene, isobutylene or vinyl aromatic compounds such as styrene as being useful dispersancy and detergency additives for oils, as well as pour point depressants and viscosity index improvers. The copolymer is esterified to about 30 to about 95% with aliphatic alcohols or mixtures of alcohols having from 10 to 20 carbon atoms, and the remaining carboxyl groups are reacted with an amine of the following formula:

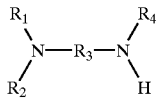

where $R_1$ and $R_2$ are selected from the group consisting of aliphatic hydrocarbon radicals having from 1 to 4 carbon atoms and the cyclohexyl radical, $R_3$ is an aliphatic hydrocarbon radical having from 2 to 4 carbon atoms, and $R_4$ is selected from the group consisting of hydrogen and aliphatic hydrocarbon radicals having from 1 to 4 carbon atoms.

U.S. Pat. No. 3,702,300 and 3,933,761 describe carboxy-containing interpolymers in which some of the carboxy radicals are esterified and the remaining carboxy radicals are neutralized by reaction with a polyamino compound having one primary or secondary amino group and at least one mono-functional amino group, and indicate that such interpolymers are useful as viscosity index improving and anti-sludge agents in lubricating compositions and fuels. The patentee indicates that it is critical that the mixed esters described in these patents include both relatively high molecular weight carboxylic ester groups having at least eight aliphatic carbon atoms in the ester radical and relatively low molecular weight carboxylic ester groups having no more than seven aliphatic carbon atoms in the ester radical.

U.S. Pat. No. 4,604,221 relates to interpolymers similar to those described in the aforementioned '300 and '761 patents, except the ester groups contain at least 8 carbon atoms in the ester radical.

U.S. Pat. No. 5,124,059 describes esters of similar interpolymers characterized by the presence within its polymeric structure of the following groups which are derived from carboxy groups of said interpolymer:

(A) at least one carboxylic ester group having at least 8 aliphatic carbon atoms in the ester group;

(B) at least one carboxylic ester group having an ester group of the formula

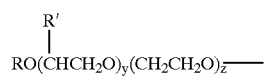

wherein R is a hydrocarbyl group of about 1 to about 50 carbon atoms, R' is a hydrocarbyl group of about 1 to about 50 carbon atoms, y is a number in the range of zero to about 50 and z is a number in the range of zero to about 50 with the proviso that both y and z cannot be zero; and optionally (C) at least one carboxylic ester group having no more than 7 aliphatic carbon atoms in the ester group.

U.S. Pat. No. 3,956,149 issued to Coleman relates to a lubricant or fuel composition containing a nitrogen-containing ester of a carboxy-containing interpolymer.

U.S. Pat. No. 3,959,159 issued to Coleman relates to lubricating compositions containing a nitrogen-containing mixed ester of a carboxy-containing interpolymer.

U.S. Pat. No. 4,284,414 issued to Bryant relates to a crude oil composition containing mixed alkyl esters of a carboxy-containing interpolymer.

U.S. Pat. No. 4,180,637 issued to Evani et al. relates to a process for preparing a low molecular weight carboxy-containing copolymer.

U.S. Pat. No. 4,200,720 issued to Evani et al. relates to a process for preparing a low molecular weight carboxy-containing interpolymer.

U.S. Pat. No. 3,085,994 issued to Muskat relates to a carboxy-containing interpolymer.

U.S. Pat. No. 3,388,106 issued to Muskat relates to a process for making a carboxy-containing interpolymer.

U.S. Pat. No. 3,392,155 issued to Muskat relates to a polyoxy alkylene glycol ester of a carboxy-containing interpolymer.

U.S. Pat. No. 5,157,088 relates to nitrogen-containing, esters of carboxy-containing interpolymers having relatively low inherent viscosity.

EP 0 848 053 A1 describes mixtures of esterified carboxy-containing interpolymers and additive concentrates and lubricating oil compositions containing same. Residual acidity of the esterified interpolymers may be neutralized by reaction with an amine.

U.S. Pat. No. 4,088,589 relates to lubricating oils blended from petroleum distillates and, if desired, a bright stock containing waxy or wax-like components and modified by the presence of copolymeric ethylene-higher alpha-olefins viscosity index improving agents, having their low temperature performance improved when said copolymer contains a minor weight proportion of ethylene by the addition of from 0.15 to 1%, based on the total weight of said lubricating oil composition of a combination of pour point depressants comprising: (a) from about 0.05 to about 0.75 wt. % of an oil-soluble condensation product of a chlorinated wax of from 10 to 50 carbon atoms and a mono- or dinuclear aromatic compound; and (b) from 0.05 to 0.75 wt. % of an oil soluble polymer of $C_{10-8}$ alkyl acrylate and/or an interpolymer of a vinyl alcohol ester of a $C_2$ to $C_{18}$ alkanoic acid and di-($C_4$–$C_{18}$ alkyl) fumarate.

The Society of Automotive Engineers (SAE) has issued a standard, J-300 (December 1995), which defines limits for classification of engine lubricating oils in rheological terms. This standard contains limits for various engine oil viscosity grades. Also included in the standard are discussions of low temperature and of high temperature test methods.

A review of developments in low temperature performance is presented by Schaub, "A History of ASTM Accomplishments in Low Temperature Engine Oil Rheology" in "Low Temperature Lubricant Rheology Measurement and Relevance to Engine Operation", R. B. Rhodes, ed., ASTM, Philadelphia, Pa. (1992), pp 1–19.

SUMMARY OF THE INVENTION

Nitrogen-containing esters of carboxy-containing interpolymers having superior oxidation stability and low temperature characteristics over other, similar viscosity modifiers are provided in accordance with the present invention. When added to lubricant compositions, these esters provide such lubricant compositions with surprisingly superior oxidative stability, as well as low temperature properties and other desirable properties including dispersancy and viscosity index improvement. These nitrogen-containing esters also enhance the dispersion of other additives as well as contaminants (e.g., dirt, water, metallic particles, etc.) in the lubricating compositions to which they are added.

Broadly stated, the present invention provides nitrogen-containing esters derived from a carboxy-containing interpolymer having a reduced specific viscosity (RSV) of from about 0.05 to about 2, said interpolymer being derived from at least two monomers, (i) one of said monomers being at least one of an aliphatic olefin containing from 2 to about 30 carbon atoms and a vinyl aromatic monomer and (ii) the other of said monomers being at least one α,β-unsaturated acylating agent, said nitrogen containing ester being characterized by the presence within its polymeric structure of each of the following groups which are derived from the carboxy groups of said interpolymer:

(A) from about 20 to about 70 mole % based on moles of carboxyl groups in said interpolymer, of ester groups containing from about 13 to about 19 carbon atoms, (B) from about 80 to about 30 mole %, based on moles of carboxyl groups in said interpolymer, of ester groups containing from about 8 to about 12 carbon atoms, optionally, (C) up to about 20 mole %, based on moles of carboxyl groups in said interpolymer, of ester groups containing from 2 to 7 carbon atoms, wherein from about 93 to about 97% of the carboxy groups derived from the carboxy-containing interpolymer are ester groups, the balance of the carboxy groups comprising residual carboxylic acid or anhydride groups which are then reacted with at least one amino compound having an average of from 1 to about 1.1 primary or secondary amino groups, in amounts to convert from about 5 up to less than 50% of the carboxylic acid or anhydride groups to (D) carbonyl-amino groups, with the unreacted carboxylic acid or anhydride groups remaining as (E) residual carboxylic acid or anhydride groups.

Additive concentrates and lubricant compositions comprising the foregoing nitrogen-containing esterified interpolymers are also provided in accordance with the present invention.

DETAILED DESCRIPTION OF THE PREFERRED EMBODIMENTS

According to the present invention compositions suitable for use as a dispersant-viscosity improver for preparing lubricating oil compositions comprise esterified interpolymers derived from a mixture of monomers as set forth in greater detail hereinabove and hereinbelow. The invention also contemplates additive concentrates and lubricating oil compositions.

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

As used in the specification and in the appended claims, the singular forms "a", "an" and "the" include plural unless the context clearly dictates otherwise. Thus, for example, reference to a polymer includes mixtures of polymers, reference to an acylating agent includes mixtures of acylating agents, etc.

In the context of this invention the term "interpolymer" means a polymer derived from two or more different monomers.

As used in the specification and claims, the term carboxy-containing refers to polymers which are prepared using a carboxy-containing monomer. The carboxy-containing monomer is polymerized with other monomers to form the carboxy-containing interpolymer. Since the carboxy-containing monomer is incorporated into the polymer backbone, the carboxy groups extend from the polymer backbone, e.g., the carboxy groups are directly attached to the polymer backbone.

As described above, the invention relates to nitrogen containing esters derived from carboxy-containing interpolymers.

In reference to the size of the ester groups, it is pointed out that an ester group is represented by the formula

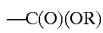

and that the number of carbon atoms in an ester group is thus the combined total of the carbon atom of the carbonyl group and the carbon atoms of the (OR) group. Thus, methyl methacrylate contains two carbon atoms in the ester group. A butyl ester contains five carbon atoms in the ester group.

In one embodiment, the present invention relates to a mixture of organic diluent and esterified interpolymers.

Certain diluents, as will be discussed in greater detail hereinbelow, provide improved low temperature properties and further enhanced resistance to oxidation.

One optional element of the present invention is the presence of up to about 20 mole %, based on moles of carboxyl group in the interpolymer, of ester groups containing from 2 to 7 carbon atoms.

Another element of the present invention is the presence of amino groups derived from amino compounds, and particularly amino compounds having an average of from 1 to about 1.1 primary or secondary amino groups. In one embodiment the amino compound is a polyamino compound having at least one mono-functional amino group. Such amino groups, when present in the esters of the present invention in the proportion stated above, enhance the dispersant properties of such esters in lubricant compositions and dispersibility of additives for lubricant compositions.

An essential feature of the instant invention is the extent of esterification and the extent of neutralization of the unesterified carboxy groups of the carboxy-containing interpolymer through the conversion thereof to amino-containing groups. It should be noted that the linkage described as the carbonyl-amino group may be salt, imide, amide, amidine and inasmuch as any such linkage is contemplated within the present invention, the term "carbonyl amino" is thought to be a convenient, generic expression useful for the purpose of defining the inventive concept. In a particularly advantageous embodiment of the invention such linkage is amide or imide, predominantly imide.

We have found that both the amount of amine used, as well as the way in which it is bound into the polymer ester is of extreme importance, and can have a significant impact on the oxidative stability of the final products. If the amino compounds are firmly bound to the polymer by stable amide or imide links, the oxidation stability will be enhanced. But if the stable amide and/or imide links are not formed, much of the amine will be attached in the form of carboxylic acid salts which can be susceptible to attack by oxygen and peroxides to a surprising extent. We have also found that using a calculated stoichiometric amount of amine, as would be the expected and common practice, does not necessarily assure that more of the desired stable amide and/or imide bonds will be formed. Surprisingly, we have found that, by using less that stoichiometric amounts of amine, although the total amount of amine incorporated into the composition is lower, the relative amount of stable amide and/or imide bonds formed, compared to unstable salts is higher, and oxidative stability is enhanced.

Still another important element of the present invention is the molecular weight of the carboxy-containing interpolymer before esterification. Whenever reference is made in this application to RSV or reduced specific viscosity, the reference is to the interpolymer before it is esterified. For convenience, the molecular weight is expressed in terms of the "reduced specific viscosity" of the interpolymer which is a widely recognized means of expressing the molecular size of a polymeric substance. As used herein, the reduced specific viscosity (abbreviated RSV) is the value obtained in accordance with the formula $$RSV = \frac{\text{Relative Viscosity} - 1}{\text{Concentration}}$$

wherein the relative viscosity is determined by measuring, by means of a dilution viscometer, the viscosity of a solution of one gram of the interpolymer in 100 ml. of acetone and the viscosity of acetone at 30 °±0.02° C. For purpose of computation by the above formula, the concentration is adjusted to 0.4 gram of the interpolymer per 100 ml. of acetone. A more detailed discussion of the reduced specific viscosity, also known as the reduced viscosity, as well as its relationship to the average molecular weight of an interpolymer, appears in Paul J. Flory, *Principles of Polymer Chemistry*, (1953 Edition) pages 308 et seq; Mark, Bikales, Overberger and Menges, Eds., *Encyclopedia of Polymer Science and Engineering*, 2nd ed., Wiley Interscience (1988), V. 14, pp 463–465; and F. W. Billmeyer, *Textbook of Polymer Science*, Wiley Publishing (1962), pp 79–85.

The Interpolymer

The carboxy-containing interpolymers useful in preparing the esters useful in the invention are copolymers, terpolymers, and other interpolymers of at least two monomers, (i) one of said monomers being at least one of an aliphatic olefin containing from 2 to about 30 carbon atoms and a vinyl aromatic monomer and (ii) the other of said monomers being at least one alpha, beta-unsaturated acylating agent, typically a carboxylic acid or derivative thereof. Derivatives of the carboxylic acid are those which are polymerizable with (i) the olefin or the vinyl aromatic monomers, and as such may be the esters, especially lower alkyl esters, e.g., those containing from 2 to 7 carbon atoms in the ester alkyl group, especially 2 carbon atoms, halides and anhydrides of the acids. The molar ratio of (i) to (ii) ranges from about 1:2 to about 3:1, preferably about 1:1. The carboxy-containing interpolymer is prepared by polymerizing the olefin or vinyl aromatic monomer with the alpha, beta-unsaturated carboxylic acid or derivative thereof.

Mixtures of two or more compatible (i.e., nonreactive to one another) interpolymers which are separately prepared are contemplated herein for use in the esterification reaction, if each has a RSV as described herein. Thus, as used herein, and in the appended claims, the terminology "interpolymer" refers to either one separately prepared interpolymer or a mixture of two or more of such interpolymers. A separately prepared interpolymer is one in which the reactants and/or reaction conditions are different from the preparation of another interpolymer.

Interpolymers having RSV from about 0.05 to about 2 are contemplated in the present invention. Preferred interpolymers are those having RSV of from about 0.05, frequently from about 0.08, often from about 0.12 or about 0.2 to about 0.8 frequently to about 0.35, often to about 0.25. In another embodiment, the RSV ranges from about 0.05, often from about 0.08, to about 0.45; in still another embodiment, from about 0.08 to about 0.35. Interpolymers having RSV of from about 0.08 to about 0.25 or from about 0.10 to about 0.2 are particularly useful.

Aliphatic Olefins

Suitable aliphatic olefin monomers that are useful in the preparation of the interpolymers of the invention are mono-olefins of about 2 to about 30 carbon atoms. Included in this group are internal olefins (i.e., wherein the olefinic unsaturation is not in the "1" or alpha position) and mono-1-olefins or alpha-olefins. Alpha olefins are preferred. Exemplary olefins include ethylene, propylene, 1-butene, isobutene, 1-pentene, 2-methyl-1-butene, 3-methyl-1-butene, 1-hexene, 1-heptene, 1-octene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tetracosene, 1-pentacosene, 1-hexacosene, 1-octacosene, 1-nonacosene, etc. Commercially available alpha-olefin can also be used. Exemplary alpha-olefin mixtures include $C_{15-18}$ alpha-olefins, $C_{12-16}$ alpha-olefins, $C_{14-16}$ alpha-olefins, $C_{14-18}$ alpha-olefins, $C_{16-}$ 18 alpha-olefins, $C_{16-20}$ alpha-olefins, $C_{22-28}$ alpha-olefins, etc. Additionally, $C_{30}$+alpha-olefin fractions such as those available from Conoco, Inc. can be used. Preferred olefin monomers include ethylene, propylene and 1-butene.

The mono-olefins can be derived from the cracking of paraffin wax. The wax cracking process yields both even and odd number $C_{6-20}$ liquid olefins of which 85 to 90% are straight chain 1-olefins. The balance of the cracked wax olefins is made up of internal olefins, branched olefins, diolefins, aromatics and impurities. Distillation of the $C_{6-20}$ liquid olefins obtained from the wax cracking process yields fractions (e.g., $C_{15-18}$ alpha-olefins) which are useful in preparing the interpolymers of this invention.

Other mono-olefins can be derived from the ethylene chain growth process. This process yields even numbered straight chain 1-olefins from a controlled Ziegler polymerization.

Other methods for preparing the mono-olefins of this invention include chlorination-dehydrochlorination of paraffin and catalytic dehydrogenation of paraffins.

The above procedures for the preparation of mono-olefins are well known to hose of ordinary skill in the art and are described in detail under the heading "Olefins" in the Encyclopedia of Chemical Technology, Second Edition, Kirk and Othmer, Supplement, pages 632–657, Interscience Publishers, Div. of John Wiley and Son, 1971, which is hereby incorporated by reference for its relevant disclosures pertaining to methods for preparing mono-olefins.

Vinyl Aromatic Monomers

Suitable vinyl aromatic monomers which can be polymerized with the alpha, beta-unsaturated acylating agents include styrene and the substituted styrenes. Other vinyl aromatic monomers such as the vinyl anthracenes and vinyl naphthalenes can also be used. Substituted styrenes include styrenes that have halo-, alkoxy-, carboxy-, hydroxy-, sulfonyl-, hydrocarbyl- wherein the hydrocarbyl group has from 1 to about 12 carbon atoms and other substituents. Exemplary of the hydrocarbyl-substituted styrenes are alpha-methylstyrene, para-tert-butylstyrene, alpha-ethylstyrene, and para-lower alkoxy styrene. Mixtures of two or more vinyl aromatic monomers can be used. Styrene and alkylstyrenes are preferred.

Alpha, Beta-Unsaturated Acylating Agent

Suitable alpha, beta-unsaturated acylating agents useful in the preparation of the interpolymers are represented by carboxylic acids, anhydrides, halides, or lower alkyl esters thereof. These include mono-carboxylic acids (e.g., acrylic acid, methacrylic acid, etc. and esters, preferably lower alkyl esters thereof, as well as dicarboxylic acids, anhydrides and esters, preferably lower alkyl esters thereof wherein a carbon-to-carbon double bond is in an alpha, beta-position to at least one of the carboxy functions (e.g., itaconic acid, anhydride or esters thereof, α-methylene glutaric acid or esters thereof,) and preferably in an alpha, beta-position to both of the carboxy functions of the alpha, beta-dicarboxylic acid, anhydride or the ester thereof (e.g., maleic acid or anhydride, fumaric acid, or ester, preferably lower alkyl, i.e., those containing no more than 7 carbon atoms, esters thereof). Normally, the carboxy functions of these compounds will be separated by up to about 4 carbon atoms, preferably about 2 carbon atoms.

A class of preferred alpha,beta-unsaturated dicarboxylic acid, anhydrides or esters, preferably the lower alkyl esters thereof, includes those compounds corresponding to the formulae:

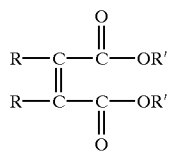

(I)

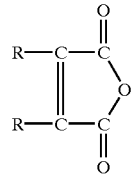

(II)

(including the geometric isomers thereof, i.e., cis and trans) wherein each R is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R is hydrogen, more preferably, both R are hydrogen); and each R' is independently hydrogen or hydrocarbyl, preferably lower alkyl of up to about 7 carbon atoms (e.g., methyl, ethyl, butyl or heptyl). These alpha, beta-unsaturated dicarboxylic acids, anhydrides or alkyl esters thereof contain a total carbon content of up to about 25 carbon atoms, normally up to about 15 carbon atoms. Examples include maleic acid or anhydride; benzyl maleic anhydride; chloro maleic anhydride; heptyl maleate; itaconic acid or anhydride; citraconic acid or anhydride, ethyl fumarate; fumaric acid, mesaconic acid; ethyl isopropyl maleate; isopropyl fumarate; hexyl methyl maleate; phenyl maleic anhydride and the like. These and other alpha, beta-unsaturated dicarboxylic compounds are well known in the art. Maleic anhydride, maleic acid and fumaric acid and the lower alkyl esters thereof are preferred. Interpolymers derived from the mixtures of two or more of any of these can also be used.

Alternatively, the (OR') group in the above formula may contain more than 7 arbon atoms, being derived from a mixture of alcohols, some containing over 7 arbon atoms, and in such instances, the ester group may remain attached to the carboxy group during and after formation of the interpolymer. This procedure provides a method of introducing the desirable ester groups initially, and eliminates the need to introduce the ester groups in a separate subsequent step.

In another preferred embodiment, the alpha, beta-unsaturated agent comprises a mixture of two or more components. Thus, interpolymers prepared from reaction mixtures wherein (ii) comprises 2 or more, usually up to 4, preferably 2, different alpha-beta unsaturated acylating agents are contemplated. A non-limiting example might be a mixture of maleic acid or anhydride with esters of acrylic acids. Other mixtures are contemplated.

When (ii) comprises a mixture of monomeric components, they may be present in any amounts relative to one another. However, it is preferred that one of the components is present in a major amount, i.e., more than 50 mole % of the mixture. In an especially preferred embodiment, the total amount of additional components is present in amounts ranging from. about 0.005 to about 0.3 moles, per mole of major component, more often from about 0.01 to about 0.15 moles, preferably from about 0.03 to about 0.1 moles minor component per mole of major component.

Examples of preferred mixtures of acylating agents are maleic acid or anhydride with esters of acrylic acids, especially esters of methacrylic acid. Preferred esters are lower alkyl esters. An especially preferred mixture of acylating agents is one containing maleic anhydride and methacrylic acid or lower alkyl esters of methacrylic acid. Especially preferred is a mixture of maleic anhydride and methyl or ethyl, preferably methyl, methacrylate.

Particularly preferred esters of this invention are those of interpolymers made by reacting maleic acid, or anhydride or the lower esters thereof with styrene. Of these particularly preferred interpolymers, those which are made of maleic anhydride and styrene and have a RSV in the range of about 0.05 to about 0.8 preferably to about 0.5, often to about 0.35, preferably from about 0.08 to about 0.25, are especially useful. Of these latter preferred interpolymers, copolymers of maleic anhydride and styrene having a molar ratio of the maleic anhydride to styrene of bout 1:1 are especially preferred. They can be prepared according to methods known in the art, as for example, free radical initiated (e.g., by benzoyl peroxide) solution polymerization. Suitable interpolymerization techniques are well known in the art and are described in numerous U.S. Patents including U.S. Pat. Nos. 2,938,016; 2,980,653; 3,085,994; 3,342,787; 3,418,292; 3,451,979; 3,536,461; 3,558,570; 3,702,300; 3,723,375; 3,933,761; 4,284,414, and 4,604,221. These patents are incorporated herein by reference for their teaching of the preparation of suitable interpolymers, especially maleic anhydride and styrene containing interpolymers. Other preparative techniques are known in the art.

The carboxy-containing interpolymers may also be prepared using one or more additional interpolymerizable comonomers. The additional comonomer is present in relatively minor proportions. Generally, the total amount is less than about 0.3 mole, usually less than about 0.15 mole of additional comonomers for each mole of either the olefin or the alpha, beta-unsaturated carboxylic acylating agent. Examples of additional comonomers include acrylamides, acrylonitrile, vinyl pyrrolidinone, vinyl pyridine, vinyl ethers, and vinyl carboxylates. In one embodiment, the additional comonomers are vinyl ethers or vinyl carboxylates.

Vinyl ethers are represented by the formula $R_1$—CH=CH—$OR_2$ wherein each $R_1$ is hydrogen or a hydrocarbyl group having 1 to about 30, or to about 24, or to about 12 carbon atoms and $R_2$ is a hydrocarbyl group having 1 to about 30 carbon atoms, or to about 24, or to about 12. Examples of vinyl ethers include methyl vinyl ether, propyl vinyl ether, 2-ethylhexyl vinyl ether and the like.

The vinyl ester of a carboxylic acid may be represented by the formula $R_3$CH=CH—O(O)$CR_4$ wherein $R_3$ is a hydrogen or hydrocarbyl group having from 1 to about 30, or to 12 carbon atoms, or just hydrogen, and $R_4$ is a hydrocarbyl group having 1 to about 30, or to about 12, or to about 8. Examples of vinyl esters include vinyl acetate, vinyl 2-ethylhexanoate, vinyl butanoate, vinyl crotonate.

The molecular weight (i.e., RSV) of such interpolymers can be adjusted to the range required in this invention, if necessary, according to conventional techniques, e.g., control of the reaction conditions.

Preferred interpolymers are prepared from a vinyl aromatic monomer and aliphatic carboxylic acids or anhydrides and esters thereof.

Preferably, the vinyl aromatic monomer is styrene or a substituted styrene (either ring substituted or substituted on the aliphatic —C=C group), most preferably, styrene.

Preferably, the aliphatic carboxylic acid or anhydride and esters thereof is at least one member selected from the group consisting of maleic acid or anhydride, itaconic acid or anhydride, fumaric acid, α-methylene glutaric acid, acrylic acid, methacrylic acid or an ester thereof or half acid-esters of the dibasic compounds.

In one preferred embodiment the interpolymer is derived from styrene and maleic anhydride. In another preferred embodiment the interpolymer is derived from styrene, maleic anhydride and methacrylic acid or an ester thereof.

In the latter preferred embodiment, the mole ratio of styrene:maleic anhydride:methacrylic acid or ester thereof ranges from about (1–3):(2–1):(0.01–0.3), preferably from about (1–2):(1.5–1):(0.01–0.03), more preferably from 1:1:(0.03–0.08), most preferably from 1: 1:0.05.

Esterification

Esterification (or transesterification, when the interpolymer contains ester groups) of the interpolymers can be accomplished by heating any of the interpolymers (having the requisite RSV) and the desired alcohol(s) and alkoxylate (s) under conditions typical for effecting esterification. Such conditions include, for example, a temperature of at least about 80° C., but more preferably up to about 150° C. or even more, provided that the temperature is maintained below the lowest decomposition temperature of any component of the reaction mixture or products thereof. Water or lower alcohol is normally removed as the esterification proceeds. These conditions may optionally include the use of a substantially inert, normally liquid, organic solvent or diluent such as mineral oil, toluene, benzene, xylene or the like and an esterification catalyst such as toluene sulfonic acid, sulfuric acid, aluminum chloride, boron trifluoride-triethylamine, methane sulfonic acid, hydrochloric acid, ammonium sulfate, phosphoric acid, sodium methoxide and the like. These conditions and variations thereof are well known in the art.

At least about 93%, preferably at least about 95% up to about 97% of the carboxy functions of the interpolymer are converted to ester groups. An excess of alcohols and alkoxylates over the stoichiometric requirement for complete esterification of the carboxy functions may be used in the esterification process provided the ester content remains within the 93–97% range. While excess of alcohols and alkoxylates or unreacted alcohols and alkoxylates need not be removed as such alcohols and alkoxylates can serve, for example, as diluent or solvent in the use of the esters, and similarly, optional reaction media, e.g., toluene, need not be removed as they can similarly serve as diluent or solvent in the use of the esters, it is generally preferred that unreacted alcohols, alkoxylates and diluents are removed by techniques such as distillation, etc., that are well-known in the art.

As noted above, the compositions of this invention contain ester groups. From about 20 to about 70 mole % based on the total number of moles of carboxyl groups in the interpolymer contain ester groups having from about 13 to about 19 carbon atoms and from about 80 to about 30 mole % based on the total number of moles of carboxyl groups in the interpolymer contain ester groups having from about 8 to about 12 carbon atoms. Preferably, the ester contains at least about 45 mole %, based on moles of carboxyl groups in said interpolymer, of ester groups containing from about 8 to about 12 carbon atoms. In an optional embodiment, the esterified interpolymer has up to about 20 mole % based on the total number of moles of carboxyl groups in the interpolymer of ester groups having from 2 to 7 carbon atoms. Preferably, the compositions are substantially free of ester groups containing from 3 to 7 carbon atoms. The ester groups are usually formed by reacting the carboxy-containing interpolymer with alcohols although frequently, especially for lower alkyl esters, the ester group may be incorporated from one of the monomers used to prepare the interpolymer. Examples of useful alcohol reactants include heptanol, octanol, 2-ethylhexanol, decanol, dodecanol, tridecanol, pentadecanol, hexadecanol, heptadecanol, octadecanol, etc.

One class of alcohols includes commercially available mixtures of alcohols. These include oxoalcohols which may comprise, for example, various mixtures of alcohols having from about 8–24 carbon atoms. Of the various commercial alcohols useful in this invention, one contains from about 8 to about 10 carbon atoms, and another from about 12 to about 18 aliphatic carbon atoms. The alcohols may comprise, for example, octyl alcohol, decyl alcohol, dodecyl alcohol, tetradecyl alcohol, pentadecyl alcohol, octadecyl alcohol, etc. Several suitable sources of these alcohol mixtures are the technical grade alcohols sold under the name NEODOL® alcohols (Shell Oil Company, Houston, Tex.) and under the name ALFOL® alcohols (Vista Chemical, Westlake, La.), and fatty alcohols derived from animal and vegetable fats and sold commercially by, for example, Henkel, Condea, and Emory.

Tertiary alkanolamines, i.e., N,N-di-(lower alkyl)amino alkanolamines, may be used to prepare the esterified interpolymers. Examples include N,N-dimethylethanolamine, N,N-diethylethanolamine, and 5-diethylamino-2-pentanol.

The esterified interpolymers may be mixed esters derived from a combination of alcohols including alcohols containing at least 7, often at least 12 carbon atoms (relatively high molecular weight alcohols) and alcohols containing less than 7 carbon atoms (relatively low molecular weight alcohols). Alcohols containing less than 7 carbon atoms include methanol, ethanol, propanol, butanol, pentanol and hexanol, including isomers thereof.

Mixed esters of the carboxy-containing interpolymer are most conveniently prepared by first esterifying the carboxy-containing interpolymer with the relatively high molecular weight alcohols then with the relatively low molecular weight alcohol in appropriate amounts, to convert at least about 93% up to about 97% of the carboxy groups of the interpolymer to ester groups. Nitrogen-containing esters are prepared by neutralizing from about 5% up to less than 50% of the remaining carboxy groups with ammonia, an amine, or a hydrazine such as those described below to obtain nitrogen-containing esters.

When utilizing a combination of high molecular weight and low molecular weight alcohols, the esterification may be carried out, for example, by initially esterifying the carboxy radicals with the higher molecular weight alcohols and then subsequently esterifying the partially-esterified carboxy-containing interpolymer with a low molecular weight, e.g., 1–6 carbon atoms, alcohol, to obtain a carboxy interpolymer having at least about 80% of the ester groups high molecular weight esters and the balance of the ester groups being low molecular weight esters. For example, esterification with a combination of high and low molecular weight alcohols may be accomplished in sequence, first carrying out the esterification with the high molecular weight alcohol then esterifying the remaining carboxylic groups with the low molecular weight alcohol, to attain the desired degree of esterification.

Alternatively, the carboxylic groups of the interpolymer may be simultaneously esterified with a mixture of the alcohols to obtain an esterified carboxy-containing interpolymer wherein at least about 80 mole percent of the ester groups have been obtained from high molecular weight alcohols and the balance of the ester groups being obtained from low molecular weight alcohols.

The Amino Compound

The carboxy-containing interpolymers contains a carbonyl-amino group. The carbonyl-amino groups include amides, imides, amidines, ammonium salts, amidic acid salts or mixtures thereof. Thus, use of the expressions "neutralize, neutralizing, etc" are not to be limiting to salt formation but refer to reaction of an amino compound with a carboxylic acid or functional derivative thereof. A carbonyl-amino group is derived from unesterified carboxylic acid or anhydride groups of the esterified interpolymer and an amino compound.

Amino compounds include ammonia and amines. Amines which are used to form carbonyl-amino groups may be mono- or polyamines provided that the average number of primary and secondary amino nitrogens is from 1 up to about 1.1. To illustrate, the amine may be a monoamine containing one primary or secondary amino group alone or in admixture with a polyamine having 2 or more primary and secondary amino nitrogens. The amino compound may be a polyamine, wherein one amino group is primary or secondary and one or more is tertiary. Aminopropylmorpholine and dimethylaminopropyl amine are examples. The amino compound may also be a mixture of these with one or more polyamines containing 2 or more primary or secondary amino groups, provided that the average number of primary or secondary amino groups in the mixture is no greater than about 1.1, preferably less than 1.05.

Examples of monoamines include aliphatic amines such as mono- and di-alkyl amines having alkyl groups containing from 1 to about 20 carbon atoms as well as cyclic monoamines.

In one embodiment, the amines are polyamines having an average of from 1 to about 1.1, preferably one, primary or secondary amino group, and at least one non-condensable mono-functional amino group such as a tertiary-amino group, a functionally-substituted nitrogen atom, or a nitrogen heterocyclic group derived from pyrroles, pyrrolidones, caprolactams, oxazolidones, oxazoles, thiazoles, pyrazoles, pyrazolines, imidazoles, imidazolines, thiazines, oxazines, diazines, oxacarbamyl, thiocarbamyl, uracils, hydantoins, thiohydantoins, guanidines, ureas, sulfonamides, phosphoramides, phenolthiazines, amidines, etc. In one embodiment, the carbonyl-polyamino group is derived from a morpholine. Examples of suitable morpholines include aminoethylmorpholine, aminopropylmorpholine, etc. Examples of such polyamines include dimethylamino-ethylamine, dibutylamino-ethylamine, 3-dimethylamino-1-propylamine, 4methylethylamino-1-butylamine, pyridyl-ethylamine, N-morpholinoethylamine, tetrahydropyridyl-ethylamine, bis-(dimethylamino)propylamine, bis (diethylamino)ethylamine, N,N-dimethyl-p-phenylenediamine, piperidyl-ethylamine, 1-aminoethylpyrazone, 2-amino-5-mercapto-thiadiazole, 1-(methyl-amino)pyrazoline, 1-methyl 4-aminooctyl pyrazole, 1-aminobutylimidazole, 4-aminoethylthiazole, 2-aminoethyltriazine, dimethylcarbamylpropylamine, N-methyl-N-aminopropylacetamide, N-aminoethylsuccinimide, N-methylamino-maleimide, N-aminobutylalpha-chlorosuccinimide, 3-aminoethyluracil, 2-amino-ethylpyridine, ortho-aminoethyl-N,N-dimethylbenzenesulfamide, N-aminoethyl-phenothiazine, N-aminoethylacetamidine, 1-aminophenyl-2-methyl-imidazoline, N-methyl-N-aminoethyl-S-ethyidithiocarbamate, etc. For the most part, the amines are those which contain only one primary-amino or secondary-amino group and, preferably at least one tertiary-amino group. The tertiary amino group is preferably a heterocyclic amino group. In some instances polyamines may contain up to about 6 amino groups although, in most instances, they contain one primary-amino group and either one or two tertiary-amino groups. The polyamines may be aromatic or aliphatic amines and are preferably heterocyclic amines such as aminoalkyl-substituted morpholines, piperazines, pyridines, benzopyrroles, quinolines, pyrroles, etc. They are usually amines having from 4 to about 30, or to about 12 carbon atoms. Polar substituents may likewise be present in the amines.

The carbonyl-amino groups of the carboxy-containing interpolymers also may comprise the groups derived from hydrazine and/or a hydrocarbon-substituted hydrazine including, for example, the mono-, di-, and tri-hydrocarbon-substituted hydrazines wherein the hydrocarbon substituent is either an aliphatic or aromatic substituent including, for example, alkyl-, e.g., cyclic and/or acyclic groups, aryl-, e.g., alkaryl-, aralkyl, etc. The hydrocarbon substituents, generally, contain from 1 up to about 24, often up to about 12 aliphatic carbon atoms. Preferred substituents, include for example, phenyl, alkylphenyl or an alkyl group wherein the alkyl group is either a methyl, ethyl, propyl, butyl, pentyl, octyl, cyclohexyl, decyl or dodecyl group. Other examples of the hydrocarbon groups include octadecyl, behenyl, benzyl, heptylphenyl, alpha-naphthyl, beta-naphthyl, butyl-naphthyl, oleyl, and stearyl groups. Of the various hydrocarbon-substituted hydrazines, a preferred class includes the N,N-dihydrocarbon-substituted hydrazines, e.g., the dimethyl, diethyl, diphenyl and dibutyl hydrazines.

The carboxy-containing interpolymer is characterized as containing a carbonyl-amino group. The carboxy-containing interpolymer may be esterified as described above. Following esterification of the carboxy groups of the interpolymer at least about 5 up to less than 50%, preferably from about 10% to about 40%, and more preferably from about 15% to about 35% of the residual carboxy groups remaining in the esterified interpolymer may be reacted with an amine at temperatures up to 350° C. or higher provided that said temperature is maintained below the decomposition point of the reactants and the products obtained thereof, more often at temperatures ranging from about 80° C., more often from about 120° C., up to about 300° C. Thus, for example, at least about 93 mole %, e.g., 93 to 97 mole %, of the carboxy groups of a carboxy-containing interpolymer may be esterified and then the partially esterified interpolymer is subsequently reacted with a amino compound to obtain a nitrogen-containing ester having from about 5 up to less than 50 percent of the unesterified carboxylic groups converted to carbonyl-amino groups. The amount of amino compound used is sufficient to react with up to less than 50% of the unesterified carboxy groups of the polymer.

In another embodiment, the carboxy-containing interpolymer is reacted with a relatively high molecular weight alcohol and optionally a relatively low molecular weight alcohol and an amino compound. The alcohols and amino compounds have been described above. The alcohols may be reacted with the interpolymer to form an intermediate which is subsequently reacted with the amino compound. Alternatively the alcohols and amine may be reacted with the interpolymer simultaneously. The relative proportions of the several described ranges of alkyl ester groups to the carbonyl-amino group are expressed in terms of mole percentages of (20–70): (80–30):(0–20):(0.05–3.5) respectively. The preferred ratio is (40–60):(70–45):(0–10):(0.1–3).

The amine compounds can be used alone as well as in various combinations in this final step, since the different amines can contribute different and often complementary stability characteristics to the final products. For example, amine compounds which contain sulfide and disulfide groups in their structures can interact synergistically with added phenolic and arylamine antioxidants in formulations in which they are subsequently used.

The Diluent

As noted hereinabove, the compositions of this invention may contain a diluent. Often they are prepared in the presence of the diluent. The diluent may also be added to a substantially diluent-free copolymer, usually by dissolving or dispersing a substantially diluent-free polymer in an appropriate diluent, or by adding a higher boiling point diluent to an interpolymer containing a lower boiling point diluent such as toluene and removing the lower boiling point diluent by, e.g., distillation.

A wide variety of diluents may be used, including natural oils such as mineral oils, vegetable oils and animal oils, and synthetic oils such as ester type oils, especially carboxylic esters, polyolefin oligomers, especially polyalphaolefin oligomers, or alkylated benzenes, and mixtures thereof. Selection of diluents having particular characteristics leads to enhanced performance of dispersant-viscosity improvers of this invention. Particularly valuable are oils of lubricating viscosity that display excellent viscosity characteristics at very low temperatures, for example from −5° C. to −40° C.

Naphthenic and synthetic diluents that impart improved low temperature performance when used in conjunction with the dispersant viscosity improvers of this invention have in common very low viscosity at very low temperatures. In particular they all display Brookfield viscosities (expressed in centipoise) at −26° C. ranging from about 50 to about 400, more preferably from about 80 to about 200. At −40° C. useful oils have Brookfield viscosities (expressed in centipoise) ranging from about 100 to about 1500, more preferably from about 125 to about 600. Brookfield viscosities are determined employing ASTM Procedure D-2983 described in greater detail hereinafter. These particularly useful diluents display viscosities (ASTM Procedure D-445) at 40° C. ranging from about 2.5 to about 6 centistokes and at 100° C. ranging from about 1 to about 2.5 centistokes.

Low temperature viscosity (Brookfield Viscosity) of fluid lubricants is determined using ASTM Procedure 2983, Standard Test Method for Low Temperature Viscosity of Automotive Fluid Lubricants Measured by Brookfield Viscometer, which appears in the Annual Book of ASTM Standards, Section 5, ASTM, Philadelphia, Pa., USA. This procedure employs a Brookfield Viscometer which is described in the procedure. The device is available from Brookfield Engineering Laboratories, Stoughton, Mass., USA.

The choice of diluent also affects oxidation performance of lubricating oil compositions containing the nitrogen containing esters of this invention. While naphthenic and hydrotreated naphthenic oils can impart particularly good viscometrics at low temperature they, and compositions containing them, tend to be oxidatively unstable. In an especially preferred embodiment the diluent consists essentially of lower viscosity, highly paraffinic oils.

Hydrotreated and hydro-refined paraffinic diluent oils comprise a most desirable and cost-effective type of base fluid for the purposes of this invention. The paraffinic oils are usually essentially linear or somewhat lightly branched in 30 structure, and when processed using hydrogen contain little, if any, residual olefinic C═C bonds which tend to be oxidatively susceptible. While some of the paraffinic diluent oils can contain relatively high levels (up to about 8%) of aromatic components, they are often not as oxidation-sensitive as their naphthenic oil counterparts of similar viscosity.

In general, the hydrotreated and hydro-refined types of diluent oils are preferred for the compositions of this invention, because of both their oxidation stability, and their good viscometrics at very low temperatures. Lighter viscosity hydrotreated or hydro-refined paraffinic diluents (of about 1.0–3.5 cSt kinematic viscosity at 100° C.) are most appropriately useful with the products of this invention in automatic transmission, gear oil, and hydraulic fluid applications, while medium viscosity hydrotreated paraffinic oils (of about 4.0–7.5 cSt kinematic viscosity at 100° C.) may also be used for application in gasoline and diesel engines.

Diluent-containing copolymers of this invention may be referred to as additive concentrates. Such additive concentrates may contain other desirable performance-improving additives which are described in greater detail hereinbelow. Additive concentrates are then added, along with other performance-improving additives, if desired, to an oil of lubricating viscosity to prepare a finished lubricant composition.

The additive concentrates preferably comprise from about 25 to about 85% by weight, preferably from 35% to about 80% by weight of the nitrogen containing esters, and from about 15% to about 75% by weight, preferably from about 20% to about 65% by weight, of substantially inert, normally liquid organic diluent. Preferably the diluent is selected from the group consisting of paraffinic oils and synthetic oils. Additive concentrates are prepared by a method comprising mixing at an elevated temperature, the foregoing ingredients, in the specified amounts,

EXAMPLES OF ESTERIFICATION OF THE INTERPOLYMER

The following examples serve to illustrate the preparation of the esters of the carboxy-containing interpolymers used in this invention and are not intended as limiting thereof. Unless otherwise indicated in these and the following examples, or elsewhere in the specification and claims, all parts and percentages are by weight, and temperatures are in degrees Celsius. Sulfuric acid is typically commercially available 93–96% $H_2SO_4$. Methanesulfonic acid is nominally 70% in $H_2O$. The extent of esterification is calculated by determining the total acid number (phenolphthalein indicator) and the strong acid number (bromphenol blue indicator) of the reaction mixture. The total acid number includes contributions from unesterified polymer and catalyst. The strong acid number is the measure of the acid number of the catalyst. The difference between the two acid numbers, the net acid number, is the acid number due to unesterified polymer.

Example 1-E

A reactor is charged with 3044 parts of a 22.1% solids in toluene slurry of a maleic anhydride/styrene/methyl methacrylate (1:1:0.05 mole ratio) terpolymer having RSV= 0.158, 3265.6 parts of a 20.6% solids in toluene slurry of a maleic anhydride/styrene/methyl methacrylate (1:1:0.05 mole ratio) terpolymer having RSV=0.143 and 1131 parts Alfol 1218 (a mixture of predominantly straight chain primary alcohols having from 12 to 18 carbon atoms). The materials are heated to 120° C. with $N_2$ blowing while removing toluene. A mixture of 70.2 parts methane sulfonic acid and 1132.6 parts Alfol 810 (a mixture of predominantly straight chain primary alcohols having from 8 to 10 carbon atoms), is added over 0.5 hour, heating is begun while removing water and excess toluene, stabilizing at 145° C. The reaction is continued for 16 hours, removing water as toluene-$H_2O$ azeotrope. An aliquot has total acid number =11.5 and strong acid number =5.13, net =6.37, about 96.4% esterified. An additional 66 parts Alfol 810 are charged and the reaction is continued for 16 hours. An aliquot has total acid number =8.9, strong acid number =3.9, net =5.0, about 97% esterified. The strong acid is neutralized with 22.4 parts 50% aqueous NaOH.

Example 2-E

An ester is prepared by a process similar to that of Example 1-E employing 1 equivalent of a toluene solution of a maleic anhydride-styrene (mole ratio 1:1) copolymer having RSV =0.145, 0.4 equivalents -OH of Alfol 1218 alcohols and 0.6 equivalents -OH of Alfol 810 alcohols.

Examples of Incorporation of Carbonyl-Amino Group

The following examples serve to illustrate the preparation of nitrogen-containing esters of the carboxy-containing interpolymers used in this invention and are not intended as limiting thereof. Unless indicated otherwise, all parts and percentages are by weight, pressures are atmospheric, and temperatures are in degrees Celsius. Filtrations are conducted using a diatomaceous earth filter aid. The "hindered phenol" is a mixture of mono- and di-tertiary butyl phenols.

Example 1-N

Following substantially the procedure of Example 1-E, 2911 parts of a 22.1% solids in toluene slurry of a maleic anhydride/styrene/methyl methacrylate (1:1:0.05 mole ratio) terpolymer having RSV=0.158 and 3124.9 parts of a 20.6% solids in toluene slurry of a maleic anhydride/styrene/methyl methacrylate (1:1:0.05 mole ratio) terpolymer having RSV= 0.143 are esterified with 1083.1 parts Alfol 1218 and 1170.2 parts Alfol 810 using 67.5 parts methane sulfonic acid. A portion (2037 parts) of the ester is mixed with 16.2 parts 50% aqueous NaOH to neutralize the strong acid. Dimethylaminopropyl amine (10.2 parts) is added and the materials are mixed for 2 hours at 150° C., 6.1 parts hindered phenol are added and the materials are stripped to 150° C. and 20 mm Hg pressure. The residue is mixed with 438.6 parts mineral oil (Total 85N) and filtered.

Example 2-N

The strong acid of 1024 parts of a product prepared as in Example 1-E is neutralized by mixing with 5.6 parts of 50% aqueous NaOH for 1 hour at 150° C. whereupon 3.1 parts aminopropylmorpholine are added over 0.2 hour followed by heating for 2 hours. A hindered phenol is added (1.8 parts) and the materials are stripped to 150° C. at 10 mm Hg pressure. Another 1.8 parts hindered phenol and 235 parts mineral oil (Total 85N) are added and after mixing, the oil solution is filtered.

Example 3-N

Following substantially the procedure of Example 1-E, 2491.5 parts of 27% solids in toluene slurry of a maleic anhydride/styrene/methyl methacrylate (1:1:0.05 mole ratio) terpolymer having RSV=0.16 and 3314.4 parts of 20.3% solids in toluene slurry of a maleic anhydride/styrene/methyl methacrylate (1:1:0.05 mole ratio) terpolymer having RSV= 0.14 are esterified with 1131 parts of Alfol 1218 and 1133 parts of Alfol 810 employing 70.3 parts 70% aqueous methane sulfonic acid. Following essentially the procedure of Example 1-N, the strong acid is neutralized with 19.2 parts 50% aqueous NaOH, 23.2 parts aminopropylmorpholine are added and reacted for 2 hours, 6.8 parts hindered phenol are added whereupon about one-third (1100 parts) of the materials are mixed with 275 parts mineral oil (Total 85N) and filtered.

Example 4-N

The procedure of Example 3-N is repeated replacing Total 85N with an equal amount of PetroCanada 100N mineral oil.

Example 5-N

The strong acid of 2040 parts of the ester before neutralization of Example 1-N is neutralized by mixing with 16.2 parts of 50% aqueous NaOH for 2 hours at 150° C. whereupon 10.2 parts dimethylaminopropylamine are added over 0.5 hour followed by heating for 2 hours. A hindered phenol is added (6.1 parts) and the materials are stripped to 150° C. at 20 mm Hg pressure. Another 1.8 parts hindered phenol and 440.6 parts mineral oil (PetroCanada 100N) are added and after mixing, the oil solution is filtered.

Example 6-N

Following substantially the procedure of Example 1-N, 2491.5 parts of a 27% solids in toluene slurry of a maleic anhydride/styrene/methyl methacrylate (1:1:0.05 mole ratio) terpolymer having RSV=0.16 and 3314.4 parts of a 20.3% solids in toluene slurry of a maleic anhydride/styrene/methyl methacrylate (1:1:0.05 mole ratio) terpolymer having RSV= 0.14 are esterified with 1131 parts of Alfol 1218 and 1133 parts of Alfol 810 employing 70.2 parts 70% aqueous methanesulfonic acid. Butanol (9.6 parts) is added and the reaction is continued for 5 hours. An aliquot has total acid number =8.4, strong acid number =3.4, net =5.0, Following essentially the procedure of Example 1-N, the strong acid is neutralized with 19.2 parts 50% aqueous NaOH, 22.5 parts aminopropylmorpholine are added and reacted for 2 hours, 6.6 parts hindered phenol are added and the materials are stripped to 150° C. at 20 mm Hg pressure. The residue is mixed with a second portion (6.6 parts) of hindered phenol and 896.2 parts mineral oil (PetroCanada 100N) and filtered.

Example 7-N

A reactor is charged with 3000 parts of the product of Example 2-E at 20.6% by weight solids in toluene, and 532.9 parts Alfol 1218 alcohols. The materials are heated, under $N_2$, to 120° C. while removing toluene. A solution of 33.8 parts methanesulfonic acid and 532.9 parts Alfol 810 alcohols is prepared and is added as a stream from an addition funnel over 0.5 hour while heating the materials to 135° C. The rate of refluxing is adjusted to maintain a fast reflux (3–5 drops per second) at 135° C. The materials are refluxed over 24 hours. Total acid number =9.5, strong acid number =4.8, net acid number =4.7 or about 97% esterified. Over 1 hour at 150° C., 20 parts 50% aqueous NaOH are added and the materials are mixed at temperature over 0.5 hour. While maintaining temperature, 5.8 parts aminopropyl morpholine are added over 0.5 hour followed by heating at 150° C. for 0.5 hour. The materials are mixed with 2.9 parts of a t-butylated phenol followed by vacuum stripping to 150° C. and 20 mm Hg pressure then, after removing vacuum, an additional 2.9 parts t-butylated phenol is added. To 920.3 parts of the materials are Eadded 230.1 parts PetroCanada 100N oil, the materials are mixed then filtered. %N =0.053.

Example 8-N

A vessel is charged with 800 parts of the stripped residue of Example 7-N, and 200 parts of polyalphaolefin oil (4 centistokes). The materials are mixed for 0.5 hour at 125° C. the filtered.

Each of the foregoing examples describes compositions of the invention wherein from about 5 up to 50% of the carboxylic acid or anhydride groups, after esterification, are converted to carbonyl-amino groups.

For comparative purposes, the following examples illustrate similar compositions, but wherein at least 50% and often up to 100% of the unesterified carboxylic acid or anhydride are converted to carbonyl amino groups.

Comparative Example 1

A reactor is charged with 3044 parts of a 22.1% solids in toluene slurry of a maleic anhydride/styrene/methyl methacrylate (1:1:0.05 mole ratio) terpolymer having RSV=0.16 and 3522.4 parts of a 19.1% solids in toluene slurry of a maleic anhydride/styrene/methyl methacrylate (1:1:0.05 mole ratio) terpolymer having RSV=0.14 and 1131 parts Alfol 1218 alcohol mixture. The materials are heated to 120° C. with $N_2$ blowing while removing toluene. A mixture of 70.2 parts methane sulfonic acid and 1132.6 parts Alfol 810 alcohol mixture is added over 0.5 hour, heating is begun while removing water and excess toluene, stabilizing at 150° C. The reaction is continued for 16 hours, removing water as toluene-$H_2O$ azeotrope. Materials are about 97.3% esterified. The strong acid is neutralized with 27 parts 50% aqueous NaOH. While maintaining the temperature, 75 parts aminopropylmorpholine are added over 0.75 hour and the temperature is maintained 1 hour followed by addition of 6 parts hindered phenol. The materials are stripped to 150° C. at 30 mm Hg pressure, cooled and mixed with 886.5 parts mineral oil (Total 85N).

Comparative Example 2

A reactor is charged with 1010 parts of the product of Example 1-E. The materials are heated to 150° C., under $N_2$ whereupon 13.3 parts dimethylaminopropyl amine are added dropwise followed by heating at 150° C. for 2 hours. After adding 1.5 parts hindered phenol, the materials are stripped to 150° C. at 10 mm Hg. Another 1.5 parts hindered phenol and 231.4 parts mineral oil (Total 85 N) are added, the materials are mixed and filtered.

Comparative Example 3

Following substantially the procedure of Example 1-E, 2503.6 parts of a 27% solids in toluene slurry of a maleic anhydride/styrene/methyl methacrylate (1:1:0.05 mole ratio) terpolymer having RSV=0.158, 1141 parts of 20.6% solids in toluene slurry of a maleic anhydride/styrene/methyl methacrylate (1:1:0.05 mole ratio) terpolymer having RSV= 0.143 and 2089.5 parts of a 21.1% solids in toluene slurry of a maleic anhydride/styrene/methyl methacrylate (1:1:0.05 mole ratio) terpolymer having RSV=0.14 are esterified with 1135.4 parts of Alfol 1218 and 1196.4 parts of Alfol 810 with 70.2 parts 70% aqueous methanesulfonic acid. Following essentially the procedure of Example 1-N, the strong acid is neutralized with 25 parts 50% aqueous NaOH, 37.5 parts aminopropylmorpholine are added and reacted for 1 hour, 6.7 parts hindered phenol are added whereupon one half (1834 parts) of the materials are mixed with 458.5 parts mineral oil (Total 85N) and filtered.

Comparative Example 4

The procedure of Comparative Example 3 is repeated replacing Total 85N with an equal amount of PetroCanada 100N mineral oil.

Comparative Example 5

A reactor is charged with 1507 parts of a 20.6% solids in toluene slurry of a maleic anhydride/styrene/methyl methacrylate (1:1:0.05 mole ratio) terpolymer having RSV=0.13 and 261 parts Alfol 1218 alcohol mixture. The materials are heated to 120° C. with $N_2$ blowing while removing toluene. After cooling the materials to 95° C., a mixture of 16.2 parts methane sulfonic acid and 261.4 parts Alfol 810 alcohol mixture is added over 0.5 hour, heating is begun while removing water and excess toluene, stabilizing at 150° C. The reaction is continued for 18 hours, removing water as toluene-$H_2O$ azeotrope. Materials are about 98% esterified. While maintaining the temperature, 27.3 parts aminopropylmorpholine are added over 0.5 hour and the temperature is maintained 1 hour followed by addition of 3.5 parts hindered phenol. The materials are stripped to 150° C. at 20 mm Hg pressure for 0,5 hour, cooled to 130° C., 3.4 parts hindered phenol are added and the materials are mixed with 214.2 parts mineral oil (Total 85N). The materials are filtered. The filtrate is the product.

The compositions of this invention are useful as viscosity-improving additives and provide enhanced dispersancy for lubricating oil compositions. As noted above, they provide exceptional oxidation resistance and also good low temperature properties without an adverse impact on higher temperature viscosity.

Lubricating oil compositions of this invention comprise a major amount of an oil of lubricating viscosity and a minor amount of the nitrogen containing esters or additive concentrates of this invention. A major amount is the greatest amount. For example, a composition containing 40% by weight of an oil of lubricating viscosity, and the balance being made up of a variety of other materials, each present in amount less that 40% by weight of the composition, is considered as comprising a major amount of an oil of lubricating viscosity. More frequently, a major amount is meant more than 50% of the total weight of a composition. Thus, for example, 51%, 80% and 99% are major amounts, and minor amounts are less than 50% by weight. Corresponding examples of minor amounts are 1%, 20% and 49%. Typically, lubricating oil compositions of this invention comprise, on a neat chemical basis, from about 0.01 to about 10% by weight, more often from about 0.20% to about 5% by weight of the nitrogen containing esterified interpolymer.

The lubricating oil compositions of this invention include lubricants for heavy duty diesel engines wherein the esters are derived from interpolymers having RSV ranging from about 0.2 to about 0.8, multigrade hydraulic fluids, lubricants for manual transmission fluids, and lubricants for continuously variable transmissions, wherein the ester is derived from interpolymers having RSV ranging from about 0.08 to about 0.35.

Additive concentrates of this invention are used in effective amounts to provide the desired viscosity index and dispersancy to a lubricating oil composition. Typically, on a neat chemical basis, they are employed to provide from about 0.01 to about 10% by weight, more often from about 0.20% to about 5% by weight of the nitrogen containing esterified interpolymer. Additive concentrates are prepared by mixing, usually at an elevated temperature to facilitate mixing, the components making up the additive concentrate. An 'elevated temperature' as defined herein is a temperature greater than normnal room temperature.

The Oil of Lubricating Viscosity

The lubricating compositions and methods of this invention employ an oil of lubricating viscosity, including natural and synthetic oils and mixtures thereof.

Natural oils include animal oils and vegetable oils (e.g., lard oil, castor oil) as well as mineral lubricating oils such as liquid petroleum oils and solvent-treated, acid treated, and/or hydrotreated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and the derivatives, analogs and homologues thereof and the like.

Alkylene oxide polymers and interpolymers and derivatives thereof where their terminal hydroxyl groups have been modified by esterification, etherification, etc., constitute another useful class of known synthetic lubricating oils.

Another suitable class of synthetic lubricating oils that can be used comprises the esters of di- and polycarboxylic acids and those made from $C_5$ to $C_{20}$ monocarboxylic acids and polyols and polyolethers.

Other synthetic lubricating oils include liquid esters of phosphorus-containing acids, polymeric tetrahydrofurans and the like, silicon-based oils such as the polyalkyl-polyaryl-, polyalkoxy-, or polyaryloxy-siloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin, III, U.S. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

Other Additives

As mentioned, additive concentrates and lubricating oil compositions of this invention may contain other additives. The use of such additives is optional and the presence thereof in the compositions of this invention will depend on the particular use and level of performance required. Thus the other additive may be included or excluded.

Compositions often comprise a metal salt, frequently a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

Other additives that may optionally be used in the lubricating oils of this invention include, for example, detergents, dispersants, supplemental viscosity improvers, oxidation inhibiting agents, corrosion inhibiting agents, pour point depressing agents, extreme pressure agents, anti-wear agents, color stabilizers and anti-foam agents. The above-mentioned dispersants and supplemental viscosity improvers may be used in addition to the nitrogen containing esters of this invention.

Extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Other oxidation inhibiting agents include materials such as alkylated diphenyl amines, hindered phenols, especially those having tertiary alkyl groups such as tertiary butyl groups in the position ortho to the phenolic -OH group, and others. Such materials are well known to those of skill in the art.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, hydrogenated diene polymers, polyalkyl styrenes, esterified styrene-maleic anhydride copolymers, hydrogenated alkenylarene-conjugated diene copolymers and polyolefins. Multifunctional viscosity improvers, other than those of the present invention, which also have dispersant and/or antioxidancy properties are known and may optionally be used in addition to the products of this invention. Such products are described in numerous publications including those mentioned in the Background of the Invention. Each of these publications is hereby expressly incorporated by reference.

Pour point depressants may be included in the additive concentrates and lubricating oils described herein. Those which may be used are described in the literature and are well-known to those skilled in the art.; see for example, page 8 of "Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. The relative amount of metal present in "basic salts" is frequently indicated by the expression "metal ratio" (abbreviated MR), which is defined as the number of equivalents of metal present compared to a "normal", stoichiometric amount. Thus, for example, a basic salt containing twice the amount of metal compared to the stoichiometric amount, has a metal ratio (MR) of 2. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,399,141 | 3,574,101 |
| 3,184,474 | 3,415,750 | 3,576,743 |
| 3,215,707 | 3,433,744 | 3,630,904 |
| 3,219,666 | 3,444,170 | 3,632,510 |
| 3,271,310 | 3,448,048 | 3,632,511 |
| 3,272,746 | 3,448,049 | 3,697,428 |
| 3,281,357 | 3,451,933 | 3,725,441 |
| 3,306,908 | 3,454,607 | 4,194,886 |
| 3,311,558 | 3,467,668 | 4,234,435 |
| 3,316,177 | 3,501,405 | 4,491,527 |
| 3,340,281 | 3,522,179 | 5,696,060 |
| 3,341,542 | 3,541,012 | 5,696,067 |
| 3,346,493 | 3,541,678 | 5,779,742 |
| 3,351,552 | 3,542,680 | RE 26,433 |
| 3,381,022 | 3,567,637 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated other additives may each be present in lubricating ompositions at a concentration of as little as 0.001% by weight, usually ranging rom about 0.01% to about 20% by weight. In most instances, they each contribute from about 0.1% to about 10% by weight, more often up to about 5% by weight.

These other additives can be added directly to lubricating oil. Preferably, however, they are diluted with a substantially inert, normally liquid organic diluent such as mineral oil, naphtha, benzene, toluene or xylene, to form an additive concentrate. The nitrogen containing esters of this invention may be incorporated into these additive concentrates. Preferred additive concentrates contain the diluents referred to hereinabove. These concentrates usually comprise from about 0.01 to about 90% by weight, often about 0.1 to about 80% by weight of the compositions of this invention and may contain, in addition, one or more other additives known in the art or described hereinabove. Concentrations such as 15%, 20%, 30% or 50% or higher may be employed.

The lubricating compositions of this invention are illustrated by the examples in the following Table. The lubricating compositions are prepared by combining the specified ingredients, individually or from concentrates, as indicated, in the indicated amounts and oil of lubricating viscosity to make the total 100 parts by weight. The amounts shown are parts by weight and, unless indicated otherwise, are amounts of chemical present on an oil-free basis. Thus, for example, an additive comprising 50% oil used at 10% by weight in a blend, provides 5% by weight of chemical. Amounts of components referred to by example number are as prepared These examples are presented for illustrative purposes only, and are not intended to limit the scope of this invention.

In the Examples of Table I, 8.1% of the nitrogen-containing esterified interpolymer of the indicated example is combined with 0.025% red dye, 7.8% of an additive concentrate containing 18.27% of a polybutene ($M_n \cong 1000$) substituted succinic anhydride-ethylene polyamine reaction product, 3.72% of $CS_2$ post treated polybutene ($M_n \cong 1000$) substituted succinic anhydride-ethylene polyamine reaction product, 3.2% of dibutyl hydrogen phosphite, 0.51% of 85% phosphoric acid, 4.29% borated polybutene ($M_n \cong 1000$) substituted succinic anhydride-ethylene polyamine reaction product, 2.56% borated $C_{16}$ epoxide, 5.64% di(nonylphenyl) amine, 6.41% of reaction product of t-dodecyl mercaptan and propylene oxide, 0.26% of N,N,-diethanol tallow amine, 1.02% of a fatty dialkyl phosphite, 0.38% of 1-OH-2-heptadecenyl imidazoline, 7.69% decyloxysulfolane, 0.38% of a mixture of S- and S,S'-t-dodecyl dimercaptothiadiazole, 5.38% of Ca overbased (MR 11) alkyl benzene sulfonic acid, 2.12% of Ca overbased (MR 1.2) alkyl benzene sulfonic acid, 3.8% of an oil solution of a calcium overbased (MR~2.5) salicylate (AC-60C from Shell Chemical Co), 0.5% of a kerosene solution of silicone antifoam agents, 0.05% of a lower alkyl ketone, and sufficient mineral oil diluent to bring the total % by weight of the additive concentrate to 100%, and mineral oil of lubricating viscosity (Texaco stocks).

TABLE 1

| Lubricant Example | Product Of Example |
|---|---|
| I | 1-N |
| II | 2-N |

The comparative lubricants of Table 2 are prepared in the same manner as those of Table 1 except the products of examples of the invention are replaced with the products of the comparative examples.

TABLE 2

| Lubricant Example | Product Of Example |
|---|---|
| Comp. I | Comp. 1 |
| Comp. II | Comp. 2 |
| Comp. III | Comp. 3 |

Comp. IV

A comparative lubricating oil composition is prepared by combining 9.8% by weight of the nitrogen-containing esterified interpolymer of Comparative Example 5 with 0.03% by weight dye mixture, 7.1% by weight of an additive concentrate containing 21.12% of a polybutene ($M_n \cong 1000$) substituted succinic anhydride-(ethylene polyamine/tris-hydroxymethyl aminomethane) reaction product, 2.82% N-phenyl-α-naphthyl amine, 4.08% of $CS_2$ post treated polybutene ($M_n \cong 1000$) substituted succinic anhydride-ethylene polyamine reaction product, 0.70% of oleylamide, 2.11% of dibutyl hydrogen phosphite, 4.72% borated polybutene ($M_n \cong 1000$) substituted succinic anhydride-ethylene polyamine reaction product, 2.82% borated $C_{16}$ epoxide, 3.55% di(nonylphenyl)amine, 7.04% of reaction product of t-dodecyl mercaptan and propylene oxide, 2.82% of N,N,-diethanol tallow amine, 8.45% decyloxysulfolane, 1.47% of glycerol monooleate, 0.42% of a mixture of S-and S,S'-t-dodecyl dimercaptothiadiazole , 5.92% of Ca overbased (MR 1.2) alkyl benzene sulfonic acid, 2.82% of magnesium overbased (MR 14.7) alkyl benzene sulfonic acid, 0.59 % of a kerosene solution of silicone antifoam agents and sufficient mineral oil diluent to bring the total % by weight of the additive concentrate to 100%, 0.04% of a kerosene solution of silicone antifoam agents and mineral oil of lubricating viscosity (Texaco stocks).

The products of the lubricant examples are subjected to oxidation conditions using a 450 hour duration modification of the Ford Aluminum Beaker Oxidation Test, wherein the oil sample is subjected to air oxidation at 150° C. Test results for several compositions are presented in the following table:

| Example | % Viscosity Increase (cSt @ 40° C.) | Acid Number Change (D-664) |
|---|---|---|
| I | 14.38 | 1.54 |
| Repeat I | 12.8 | 1.30 |
| II | 5.1 | 1.31 |
| Repeat II | 5.3 | 0.60 |
| Comp III | 17.2 | 2.81 |
| Comp IV | 31.3 | 1.56 |

It can be seen from the foregoing data that the oxidative stability of lubricating oil compositions containing the compositions of the instant invention is surprisingly superior to that of a lubricating oil composition containing a composition of the prior art.

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A nitrogen-containing ester derived from a carboxy-containing interpolymer having a reduced specific viscosity (RSV) of from about 0.05 to about 2, said interpolymer being derived from at least two monomers, (i) one of said monomers being at least one of an aliphatic olefin containing from 2 to about 30 carbon atoms and a vinyl aromatic monomer and (ii) the other of said monomers being at least one alpha, beta-unsaturated acylating agent, said ester being characterized by the presence within its polymeric structure of each of the following groups which are derived from the carboxy groups of said interpolymer:
    (A) from about 20 to about 70 mole % based on moles of carboxyl groups in said interpolymer, of ester groups containing from about 13 to about 19 carbon atoms,
    (B) from about 80 to about 30 mole %, based on moles of carboxyl groups in said interpolymer, of ester groups containing from about 8 to about 12 carbon atoms, optionally,
    (C) up to about 20 mole %, based on moles of carboxyl groups in said interpolymer, of ester groups containing from 2 to 7 carbon atoms, wherein from about 93 to about 97% of the carboxy groups derived from the carboxy-containing interpolymer are ester groups, the balance of the carboxy groups comprising residual carboxylic acid or anhydride groups which are then,
    (D) reacted with at least one amino compound having an average of from 1 to about 1.1 primary or secondary amino groups, to convert from about 5 up to less than 50% of the carboxylic acid or anhydride groups to carbonyl-amino groups, with the unreacted carboxylic acid or anhydride groups remaining as
    (E) residual carboxylic acid or anhydride groups.

2. The ester of claim 1 which is substantially free of ester groups containing from 3 to 7 carbon atoms.

3. The ester of claim 1 containing at least about 45 mole %, based on moles of carboxyl groups in said interpolymer, of ester groups containing from about 8 to about 12 carbon atoms.

4. The ester of claim 1 wherein the aliphatic olefin is an alpha olefin.

5. The ester of claim 1 wherein the vinyl aromatic monomer is styrene or a substituted styrene.

6. The ester of claim 1 wherein the alpha, beta-unsaturated acylating agent is an aliphatic carboxylic acid or anhydride, or esters thereof.

7. The ester of claim 6 wherein the alpha, beta-unsaturated acid or anhydride, or ester thereof is at least one member selected from the group consisting of maleic acid or anhydride, itaconic acid or anhydride, fumaric acid, α-methylene glutaric acid, acrylic acid, methacrylic acid or an ester of any of these, or half acid-esters of the dibasic compounds.

8. The ester of claim 1 wherein the interpolymer is derived from styrene and maleic anhydride.

9. The ester of claim 8 wherein the interpolymer is further derived from methacrylic acid or an ester thereof.

10. The ester of claim 1 wherein the mole ratio of (i):(ii) ranges from about 1:2 to about 3:1.

11. The ester of claim 9 wherein the mole ratio of styrene: maleic anhydride methacrylic acid or ester thereof ranges from about (1–3):(2–1):(0.01–0.3).

12. The ester of claim 11 wherein the mole ratio of styrene: maleic anhydride: methacrylic acid or ester thereof is about 1:1:0.05.

13. A composition comprising from about 25% to about 85% by weight of the ester of claim 1 and from about 15% to about 75% by weight of a diluent selected from the group consisting of paraffinic oils and synthetic oils.

14. A composition according to claim 13 wherein the diluent is a hydrotreated or hydrorefined paraffinic oil.

15. A composition according to claim 13 wherein the diluent is a synthetic oil selected from the group consisting of carboxylic esters and polyalphaolefin oligomers.

16. The ester of claim 1 wherein the RSV of the interpolymer ranges from about 0.05 to about 0.80.

17. The ester of claim 16 wherein the RSV of the interpolymer ranges from about 0.08 to about 0.45.

18. The ester of claim 1 wherein the at least one amino compound is a polyamino compound.

19. The ester of claim 18 wherein the polyamino compound is selected from the group consisting of aminopropylmorpholine and dimethylaminopropyl amine.

20. An additive concentrate comprising from about 25% to about 85% by weight of the nitrogen containing ester of claim 1 and from about 15% to about 75% by weight of a substantially inert, normally liquid organic diluent.

21. A method comprising mixing, at an elevated temperature, from about 25% to about 85% by weight of the nitrogen containing ester of claim 1 and from about 15% to about 75% by weight of a substantially inert, normally liquid organic diluent.

22. A lubricating oil composition comprising a major amount of an oil of lubricating viscosity and a minor amount of the ester of claim 1.

23. The lubricating oil composition of claim 22 wherein the composition is an automatic transmission fluid and the ester is derived from an interpolymer having RSV ranging from about 0.08 to about 0.45.

24. The lubricating oil composition of claim 22 wherein the composition is a gear lubricant and the ester is derived from an interpolymer having RSV ranging from about 0.05 to about 0.35.

25. The lubricating oil composition of claim 22 wherein the composition is a crankcase oil for gasoline engines and the ester is derived from an interpolymer having RSV ranging from about 0.2 to about 0.8.

26. The lubricating oil composition of claim 22 wherein the composition is a lubricant for heavy duty diesel engines and the ester is derived from an interpolymer having RSV ranging from about 0.2 to about 0.8.

27. The lubricating oil composition of claim 22 wherein the composition is a multigrade hydraulic fluid and the ester is derived from an interpolymer having RSV ranging from about 0.08 to about 0.35.

28. The lubricating oil composition of claim 22 wherein the composition is a lubricant for manual transmissions and the ester is derived from an interpolymer having RSV ranging from about 0.08 to about 0.35.

29. The lubricating oil composition of claim 22 wherein the composition is a lubricant for continuously variable transmissions and the ester is derived from an interpolymer having RSV ranging from about 0.08 to about 0.35.

* * * * *